Feb. 21, 1961    H. MELLE    2,972,289
PHOTOGRAPHIC CAMERA
Filed May 21, 1956    3 Sheets-Sheet 1

Heinz Melle
INVENTOR

Feb. 21, 1961  H. MELLE  2,972,289
PHOTOGRAPHIC CAMERA
Filed May 21, 1956  3 Sheets-Sheet 2

Heinz Melle
INVENTOR

Feb. 21, 1961 H. MELLE 2,972,289
PHOTOGRAPHIC CAMERA
Filed May 21, 1956 3 Sheets-Sheet 3
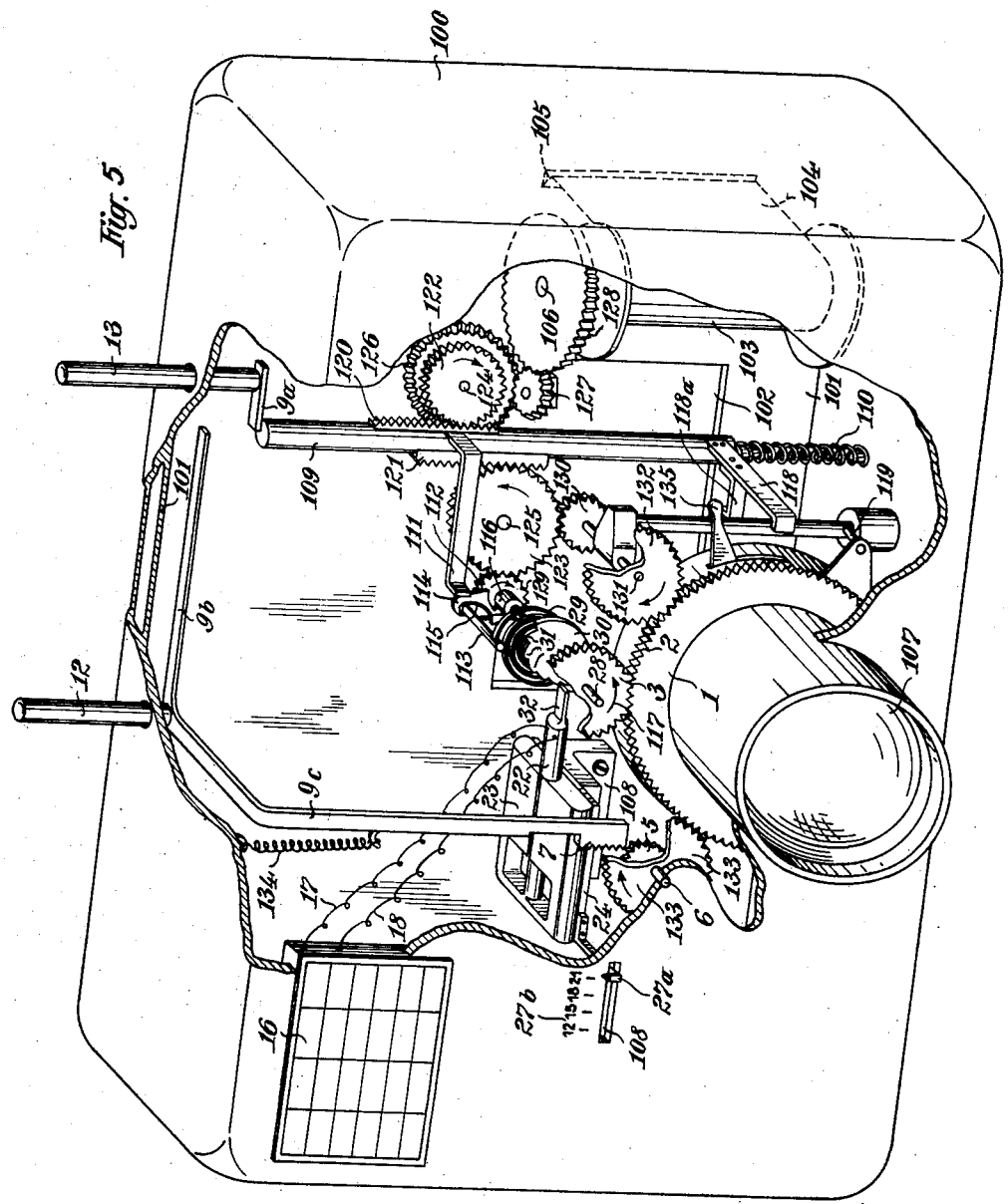
INVENTOR
Heinz Melle United States Patent Office 2,972,289
Patented Feb. 21, 1961

2,972,289

PHOTOGRAPHIC CAMERA

Heinz Melle, Braunschweig, Germany, assignor to Voigtländer A.G., Braunschweig, Germany, a corporation of Germany Filed May 21, 1956, Ser. No. 586,057

Claims priority, application Germany May 28, 1955

5 Claims. (Cl. 95—10)

This invention relates to a photographic camera provided with automatic means for the adjustment of exposure conditions and it has particular relation to photographic cameras of this type including a photoelectric cell whose output current is utilized to adjust the position of a movable element of a measuring device, with the adjusted position of such movable element being scanned by means controlling the setting of exposure values for the camera.

The previously suggested photographic cameras, in which the diaphragm and/or the shutter time is controlled and automatically adjusted by a photo cell, have various disadvantages, such as the necessity of assembling a considerable number of complicated parts, high sensitivity, susceptibility to trouble, and high manufacturing costs and their operation is not reliable.

According to the present invention, all of the above mentioned disadvantages can be eliminated in a very simple manner by arranging the means for scanning the positions of the movable element of the measuring device on a shaft which is rotatable to effect the adjustment of the exposure conditions. It has been found that this eliminates the necessity for transmission, guiding and coupling elements, which are susceptible to trouble, and a simple, reliably operating structure is obtained.

More specifically, the movable element of the measuring device may be movable either longitudinally of itself or may be oscillatable, and preferably, the movement thereof is effected electromagnetically, responsive to the output current of the photocell. The scanning means comprises an essentially cylindrical member mounted on or integral with the afore-mentioned rotatable shaft, and this cylindrical member has stops projecting radially from its surface in such a manner that only one particular stop will engage the movable member of the measuring device in accordance with the extent of the movement of the latter. Means are preferably provided to brace or support the movable element of the measuring device to prevent undue deflection thereof when engaged by a projecting stop on the scanning means.

The shaft on which the scanning means is secured is connected by gearing or the like to the adjusting means for exposure conditions of the camera, such as the means for adjusting the shutter time adjusting means and the diaphragm opening. This latter means is preferably a ring gear.

Rotation of the shaft carrying the scanning means is effected in response to the operation of either of a pair of operating keys. One of these operating keys is arranged to be operated in taking instantaneous exposures, whereas the other operating key is operated during the taking of exposures in which an enhanced depth of vision is desired. When the instantaneous exposure operating key is depressed, it initially effects release of the shaft carrying the scanning means for rotation, under the influence of a bias spring, to a point where its motion is arrested by engagement of one of the stops of the scanning means with the movable element of the light measuring device. This effects pre-setting of the adjusting means for the exposure conditions of the camera. Upon further movement of this instantaneous exposure key, the shutter is released. When the key is then released by the operator, it returns to its initial position. During its return to the initial position, this key effects re-setting of the shutter and, through rack and gearing means, effects re-setting of the shaft carrying the scanning means. Such return movement of the instantaneous exposure key also effects advance of the film to the next picture position.

The exposure condition adjusting means has two initial positions, or reference points, spaced 180 degrees apart. One of these points is used as the starting point for adjustment during the taking of instantaneous exposure. The other position is utilized for adjustment of exposure conditions for enhanced depth of vision exposures. When the depth of vision key is depressed, it initially effects rotation of the exposure condition adjusting means through 180 degrees to set the latter for depth of vision exposure adjustment. Then, this exposure key effects the afore-mentioned operation of taking the picture by operating the operating means associated with the instantaneous exposure key. The gearing interconnecting the keys with the rotatable shaft and other elements is provided with one-way clutches and slip clutches in such a manner that the rotatable shaft and the adjusting ring gear are operated only under certain conditions, as during return movement of the operator actuated by the instantaneous exposure key and during the initial and the terminal return movement of the depth of vision exposure key.

As a feature of the invention, the light measuring device, including its movable element, is adjustably positioned in the camera and an arm projects from the relatively fixed portion, or magnetic pole structure, of this device through a slot in a camera wall and has a pointer cooperable with a film sensitivity scale. By moving the pointer along this film sensitivity scale, the film sensitivity factor may be taken into consideration in adjusting the "starting" position of the light measuring device.

To provide sufficient power for operating the movable element of the light measuring device, an amplifier may be provided between the photoelectric cell and the electromagnetic means for positioning such movable elements. It will be further noted that all of the operations necessary to take a picture are performed automatically responsive to operation of either of the two keys.

The appended drawings illustrate some specific embodiments of, and best ways for carrying out, the invention.

Parts or elements which are not necessary for the understanding of the operation of the present invention have been omitted. Equal parts or corresponding elements have been denoted by identical reference symbols in all figures.

Fig. 5 diagrammatically illustrates a photographic camera provided with an arrangement embodying the present invention.

Figure 2:
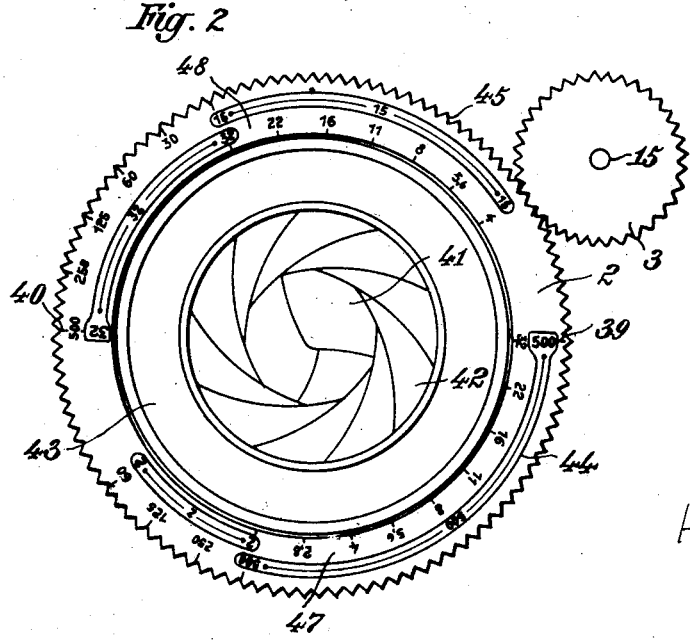
Fig. 2 is a top view of an adjusting organ by which adjustment of two exposure factors is brought about individually in succession by a continuous movement.

Referring first to Fig. 2, the camera shutter lamellae are denoted 41, the diaphragm lamellae 42 and the shutter casing 43. The adjusting organ 8, which has the shape of a ring gear, is seated around the casing 43 and is provided on its periphery with gear teeth 45. Gear teeth 45 mesh with the teeth of gear 3 which is driven—through one-way coupling 15—by the automatic system controlled by the exposure meter, in clockwise direction. Two scale systems 47 and 48, for time and diaphragm respectively are applied to the face of ring gear 45 and can be read with reference to point 39 in Fig. 3. The initial points 39 and 40 are located diametrically opposite each other and represent initial points at which automatic adjustment starts. Gear 3 is turned automatically by an amount corresponding to the measured light value. Its maximum range of rotation corresponds to the entire range of one of the scales 47 or 48.

It will be appreciated that initial points 39 and 40 rotate with disc 2 and that the actual adjustment of diaphragm and time corresponds in each case to those diaphragm values and time values of the respective scales which are located in the respective adjustment, at the point where the reference symbol 39 is shown in the drawing in Fig. 2.

If it is now assumed that the operating button for snapshots is depressed in the camera, as will be described further below in connection with Fig. 5, the initial point 39 for the automatic system is selected. Gear 3 rotates until it is stopped by the automatic system in conformity with the light value. Thereby, it moves the adjusting ring 2 counter-clockwise. As shown in Fig. 2, the initial point 39 means a time adjustment of 1/500 second and a diaphragm adjustment value of 32. Upon movement of ring 2 in the manner described above, the time indication, as indicated along the arcuate slot 44, remains the same, and is consecutively combined with the diaphragm values 32, 22 . . . 2.

If one of these combinations of exposure factors corresponds to the measured light value, automatic release of the shutter takes place. If, however, such correspondence does not occur during such adjustment then, upon further rotation of ring 2, the diaphragm value 2 remains unchanged, as explained above, and will be combined with the shutter time values 1/250, 1/125 and so on, until a light value corresponding to the available light conditions is attained by adjustment of suitable time and diaphragm values, and release of the shutter takes place, provided that, within the entire range, a proper exposure of the film is possible.

If a picture of great depth of vision is supposed to be taken the operating handle for "Depth," located on the camera, is operated as will be described further below in connection with Fig. 5. Thereby, ring 2 will be turned in clockwise direction by the half of its periphery. As mentioned above, gear 3 is provided with a one-way coupling 15 so that it can run idle. The initial point 40 has now to be assumed as shifted to the point where the initial point 39 is shown in the drawing. If now the automatic system starts to operate, a procedure which is analogous to that described above will take place. However, in this case, first all available time values will be combined with the constant diaphragm value 32, and then all other diaphragm values from 22 to 4, with the constant time value of 1/15 second. If the shutter is released, exposure will be effected under conditions which result in the greatest possible depth of vision.

From the foregoing, it will be noted that, when automatic adjustment of exposure conditions is effected by counterclockwise rotation of ring 2 from the position shown in Fig. 2, the movement of the scales, extending from point 39, past the initial position of point 39, will result first in adjustment of the diaphragm opening through the range from "32" to "2," with the shutter time being maintained constant at "500." If the automatic adjustment of ring 2 continues, the diaphragm opening is maintained constant at "2," while the shutter time is adjusted from "500" through its adjustment range to "60."

On the other hand, if ring 2 is first rotated clockwise to reverse the relative positions of points 39 and 40, and then rotated counterclockwise by the automatic exposure condition setting means, the following occurs. First, the diaphragm opening is increased from "4" to "32" with the shutter time held constant at "15." Then, the diaphragm opening is held constant at "32" while the shutter time is adjusted from "15" toward "500."

Summarizing, in an "instantaneous" exposure (1) the diaphragm opening is adjusted with the shutter time remaining constant and then (2) the shutter time is increased with the diaphragm opening maintained constant at a minimum value. In a "depth of vision" exposure, (1) ring 2 is rotated 180 degrees clockwise, then (2) the diaphragm opening is maintained constant at a maximum value while the shutter time is progressively increased, and finally (3) the shutter time is maintained constant at a maximum value while the diaphragm opening is progressively decreased.

Figure 1:
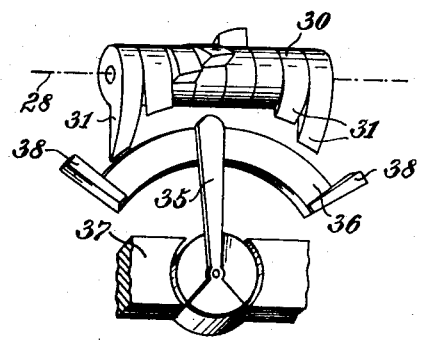
Fig. 1 illustrates by way of example a rotating coil instrument with a coordinated scanning member adapted to be used in carrying out the invention.

Fig. 1 illustrates a rotating coil instrument and the scanning element pertaining thereto. Pointer 35 is movable in the magnetic system 37 and the end of said pointer serves as a stop for the projecting elements 31 of the scanning member 30 fastened to the rotatable shaft 28. Below the path of oscillation of the pointer, a supporting ledge 36 is provided to support and brace the pointer 35 upon impact of projecting elements or teeth 31. The deflection range of the pointer is limited by stops 38.

Figure 3:
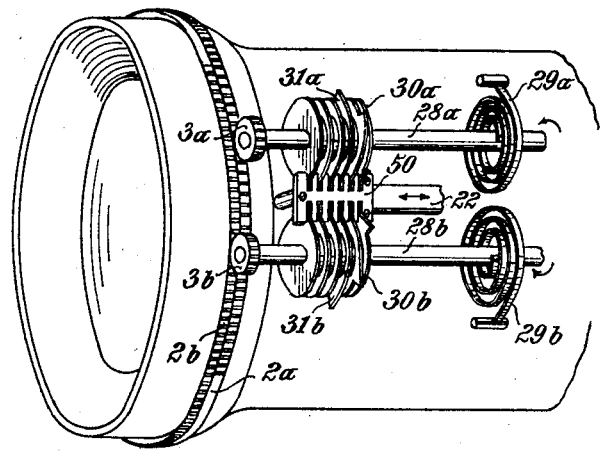
Fig. 3 illustrates the arrangement of scanning members in a case in which two exposure adjusting organs are provided, each of which has one initial point.

Fig. 3 illustrates an embodiment of the invention in which instead of only one adjusting ring, two adjusting rings 2a and 2b are provided. Each of the adjusting rings is coordinated with a separate scanning element which, in turn, is coordinated with a separate operating means and can be operated by the latter only. If the "Instantaneous" or "Snapshot" key is selected, then, for example, shaft 28a is released and turned by spring 29a until one of the teeth 31a of scanning element 30a abuts the measuring element 22. This rotary movement is transmitted by gear 3a to ring gear 2a of the respective adjusting organ for the adjustment of time and diaphragm. Upon operating the "Depth" key, the spring 29b turns shaft 28b with the scanning element 30b until one of the projecting elements or teeth 31b abuts element 22, whereby ring gear 2b, which is moved by gear 3b, effects adjustment of the exposure. In order to relieve member 22 during scanning, a supporting grid 50 is provided.

Figure 4:
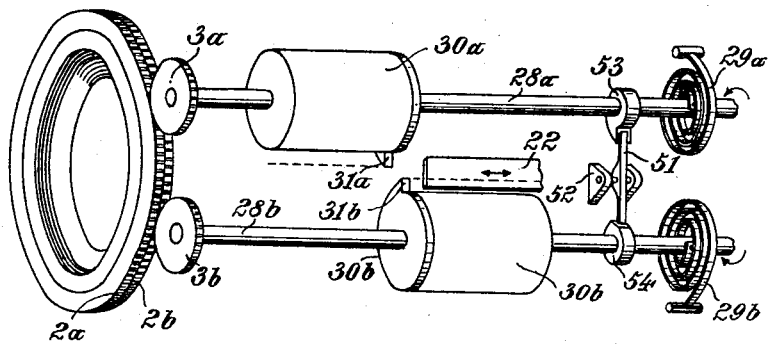
Fig. 4 illustrates the scanning device in a case in which simple adjusting rings are used for the adjustment of exposure factors, said adjusting rings being of the generally used type for adjustment of time and diaphragm.

Fig. 4 illustrates a modification in which no special adjusting means is necessary, and the use of simple diaphragm-adjusting and time-adjusting rings is sufficient. In the modification shown in Fig. 4, the scanning means 30 is divided into two sections 30a and 30b, which are seated on separate shafts 28a and 28b on opposite sides of member 22. Shaft 20a is arranged to rotate diaphragm adjusting ring 2a through the medium of a gear or pinion 3a, and shaft 28b is arranged to rotate the ring through a pinion or gear 3b engaging the gear teeth 2b. Assuming that shaft 28a is released for rotation under the influence of spring 29a, a complete revolution of shaft 20a will adjust the ring through all of the diaphragm values. If, during this single revolution, no tooth 31a contacts the element 22, then latch 53 on shaft 28a will operate lever 51. This lever is pivoted in bearings 52 and, when so operated, disengages or releases cam 54 on shaft 28b. Shaft 28b is now rotated by spring 29b until such time as a tooth 31b of the section 30b engages element 22. During such rotation, the pinion or gear 3b adjusts the time value setting of the ring 2.

Fig. 5 illustrates a camera which is provided with an automatic system embodying the present invention.

The camera casing 100 contains a partition 101 which has a rectangular aperture 102 for the film window and provides support for various individual parts of the automatic system. In the interior of the camera, 103 denotes the film wind-up spool which causes movement of the film 104 along film window 102 and through slot 105 of partition 101 in order to wind it upon its shaft 106. Two separate keys 12 and 13 project from the upper camera wall, one of which can be coordinated to exposures in which depth of vision is particularly essential, while the other key is coordinated to exposure in which an exposure time, which is as short as possible, is desirable. A photoelectric organ, for example, a photoelectric cell 16, is arranged in the front wall of the camera casing 100, which also supports the picture taking objective 107. Moreover, the front wall of the camera has a slot 108 through which projects a pointer member 27a which can be adjusted by hand along a film sensitivity scale 27b. Pointer 27a is fixedly connected with plate 24 on which the electromagnetic measuring device 23 rests and which is displaceable relative to the support 108. If the pointer 27a is displaced, the measuring device 23 and its adjusting member 22, 32 will be likewise displaced, whereby the film sensitivity factor is applied to the automatic system. The measuring device 22, 23 used according to Fig. 5 is a moving coil system consisting of a conventional electromagnetic device which comprises a stationary permanent magnet 23 having a pair of facing poles, of the same polarity, with arcuate pole faces partially defining a cylindrical passage. Into this cylindrical passage, and concentric therewith, extends the other pole of the magnet, this pole being cylindrical and having a diameter such that its surface is spaced from the facing arcuate surfaces of the two poles of the opposite polarity. A tubular member 22 is telescoped over this cylindrical pole and axially movable relative thereto, this tubular member having a winding embedded therein and connected with photocell 16 by wires 17 and 18. If an electric current derived from said photocell flows through its winding, member 22 will be electromagnetically pulled into magnet 23, and the amount of the resulting axial displacement of member 22 will depend on the intensity of the electric current flowing through its winding. It is assumed that the adjusting means 1, 2 arranged around objective 107 corresponds to that shown in Fig. 2. It is further assumed that the camera is in a condition ready for exposure. Upon operating the release means, the following functions are automatically effected in the camera:

If, for example, release key 13, for instantaneous pictures requiring a rather short exposure time, is depressed, the ledge 9a, which is fixedly connected with key 13, exerts pressure on rod 109 which is moved downwardly against the force of spring 110. Thereby, arm 111 exerts pressure on inclined surface 112 of stop member 114, which is rotatable about stationary pin 113, and forces the stop nose thereof, against the bias of spring 115, out of the stop groove of sleeve 116, which latter is fixed on the shaft 28. If this stop is released, spiral spring 29 will turn shaft 28 in the direction of arrow 117 until one of the teeth 31 of step disc 30, which is fixed on shaft 28, contacts stop 32 of the electro-magnetic adjusting member 22 of measuring device 23. Step disc 30 is designed in such a manner that the distance between its teeth 31 from the center of rotation of the disc gradually increases. As the position of the stop member 22, 32 always corresponds to the light conditions, under which the picture is taken, and which are measured by the exposure meter, it will project to a varying extent from magnet system 23 and the tooth 31 abutting member 22 in each individual case determines the angle of rotation of gear 3, and thus the adjustment value for the exposure, by rotation of means 1, 2.

If the rod 109 is further depressed, its arm 118 contacts shutter release lever 119, and release the shutter.

The control rod 109 is provided with two racks 120 and 121, which mesh respectively with gears 122 and 123. Each of these gears 122 and 123 is coordinated with a one-way coupling which—for example, for gear 122—can operate between gear 122 and shaft 124 and, for gear 123, between shaft 28 and gear 129, on the one hand, and shaft 131 and gear 130, on the other hand. These one-way couplings have the effect that gears 122 and 123 rotate idly upon downward movement of rod 109.

If, at the lowest position of rod 109, through arm 118 thereof, and release lever 119, release of the shutter has taken place and operating key 13 is released, spring 110 forces rod 109 upward back to its initial position. During this upward movement, gear 124 will be rotated by rack 120 and rotates film spools 103 through bevel gears 126, 127, 128, to thereby bring about advance of film 104 by one picture section.

The second rack 121 rotates during upward movement of rod 109, the gear 123, whereby shaft 28 is turned through gear 129, fixed on shaft 28, to such an extent that detent 114 enters the stop groove of sleeve 116 and spring 29 is again set for the automatic adjustment in connection with the next release of the camera. This rotation of shaft 28 has no effect on gear 3, because in the latter, also, the idle motion of a one-way coupling acts in this direction of movement. Return of the adjusting organ 1, 2 to the initial position takes place during upward movement of rod 109, through gears 123, 130, 132. As the amount of displacement of means 1, 2 effected, prior to each exposure, by gear 3, is determined by the available light conditions in each case, i.e., from the respective position of measuring member 22, 32, the degree of such displacement will be different in individual cases. Therefore, in returning the respective members to initial position, the degrees of reverse rotation will likewise differ. However, the reverse rotation of gear 132 will be determined in each return stroke, by rod 109. Therefore, a slipping clutch is provided between gear 132 and shaft 131 and is effective in such a manner that, first the adjusting means 1, 2 is returned to its initial position, but the further rotation of shaft 131 effected by the back stroke of rod 109 is taken up by the slipping clutch.

Simultaneously with these steps, arm 118a of rod 109, during upward movement of the latter, moves shutter setting lever 135 which snapped downward upon release of the shutter, upward to such an extent that it reaches or exceeds its set position.

When rod or operator 109 has been returned to its initial position, under the influence of spring 110, all the operations necessary for taking the exposure and for setting the camera for the next exposure will have been effected automatically. Thus, to take the next picture, it is merely necessary to depress a selected one of the keys 12 and 13.

In the above description, camera functions have been considered in which an exposure time which is as short as possible is essential, e.g., pictures of fast moving objects. It has been assumed that, in taking such pictures, key 13 has been operated.

If pictures to be taken are such that a great depth of vision is desirable, operating key 12 is used. If this key is depressed, rack 7, which engages pinion 5, causes rotation of gear 133 which is fixed to pinion 5. This rotation of gear 133 rotates adjusting means 1, 2 to its other initial point, which corresponds to dot 40 in Fig. 2. During this preliminary adjustment of means 1, 2, gear 3 rotates idly due to its one-way coupling, while, for gear 132, its slipping clutch comes into effect. After the preliminary adjustment of means 1, 2 is completed, the rack 7 disengages pinion 5. Simultaneously, however, control arm 9b of key 12 engages control rod 109 and presses down the latter. Thereby, the same functions as described above in connection with the operation of key 13 occur in succession, until, upon the release of key 12, control arm 9b thereof is disengaged from control rod 109 by the pull of spring 134. Starting at this moment and until the key 12 is again in rest position, the rack 7 is again in engagement with pinion 5 so that, through gear 133, the means 1, 2 is again restored to its initial position.

Thus, all components of the automatic system are again in initial position, so that it can be freely selected again whether the next exposure should be effected by key 13, e.g., with shortest exposure time, or by key 12, e.g., with a great depth of vision.

It will be understood from the above that this invention is not limited to the specific elements, arrangements, steps, designs and other details specifically described above and can be carried out with various modifications without departing from the scope of the invention as defined in the appended claims.

I claim:

1. In a camera having a shutter release means and a shutter re-setting means, the combination comprising: an exposure condition setting means in the form of a rotatably mounted ring gear having a pair of diametrically opposite initial reference points for the start of exposure condition setting; a rotatable shaft; gearing, including a one-way coupling, interconnecting said shaft and ring gear for rotation of said ring gear by said shaft; first means biasing said shaft to rotate siad ring gear in a selected direction relative to the initial position of said one reference point; releasable latch means normally latching said shaft against rotation, with said reference points at their respective initial positions; light measuring means including an element displaceable in accordance with the value of the measured light available for exposure; scanning means rotatable with said shaft and operable to engage said element after a predetermined rotation of said shaft, corresponding to the measured light value as represented by displacement of said element, to arrest rotation of said shaft; a relatively elongated operator mounted for movement longitudinally of itself adjacent said shaft; second means biasing said operator to a set position; means on said operator effective, upon movement of the latter away from its set position, to engage said latch means to release the latter for rotation of said shaft by said first biasing means; means on said operator effective, upon continued movement thereof away from its set position, to engage and operate said shutter release means; second gearing, including one-way and slip coupling means, interconnecting said operator with said shaft and said ring gear and operable, upon movement of said rod toward its set position, to rotate said shaft back to its latched position and to rotate said ring gear back to a position wherein said reference points are at their initial positions; a first key operable directly, when manually actuated, to move said operator away from its set position; a second key; a third gearing effective to interconnect said second key and said ring gear; said second key, immediately upon manual actuation thereof, rotating said ring gear oppositely to said selected direction to displace said reference points from their initial positions; stop means on said second key effective, after a predetermined rotation of said ring gear in such opposite direction, to engage said operator and move it away from its set position in the same manner as said first key; and third biasing means operable to return said second key to its initial position; said second key, upon such return and after disengagement of said operator by said stop means, rotating said ring gear, through said third gearing, in said selected direction to return said reference points to their initial positions.

2. In a camera as claimed in claim 1: means on said operator effective, during movement of said operator toward its set position, to engage and operate said shutter re-set means.

3. In a camera as claimed in claim 1: said ring gear being provided with a first shutter time scale of constant time values extending from said one reference point through a relatively long predetermined arc; a first diaphragm opening scale substantially co-extensive with said first shutter time scale, with the opening values progressively decreasing from said one reference point to a minimum; a second shutter time scale of increasing time values extending in continuation of said first shutter time scale through a relatively short predetermined arc; and a second diaphragm opening scale of constant minimum diaphragm opening value substantially co-extensive with said second shutter time scales; all of said scales extending in the same circumferential direction from said first reference point.

4. In a camera as claimed in claim 1: film winding means; and gearing interconnecting said operator and said film winding means and effective, upon movement of said operator toward its set position, to operate said film winding means to move the film from one picture frame to the next succeeding picture frame.

5. In a camera as claimed in claim 1: said light measuring means including a magnetic pole structure associated with said element; a photoelectric responsive means; said element having a winding connected to the output of said photoelectric responsive means; said pole structure being adjustable toward and away from said rotatable shaft by means of an indicator projecting through a wall of the camera; and a film sensitivity scale on such wall cooperable with said indicator.

References Cited in the file of this patent

UNITED STATES PATENTS

| | | |
|---|---|---|
| 2,058,531 | Tuttle | Oct. 27, 1936 |
| 2,148,963 | Rauch | Feb. 28, 1939 |
| 2,325,463 | Axler et al. | July 27, 1943 |

FOREIGN PATENTS

| | | |
|---|---|---|
| 802,940 | France | Feb. 28, 1936 |
| 806,416 | France | Sept. 21, 1936 |